(12) United States Patent
Rodgers et al.

(10) Patent No.: US 7,734,129 B1
(45) Date of Patent: Jun. 8, 2010

(54) SUPER-S MULTIPLE-TAPPED OPTICAL DELAY LINE

(75) Inventors: J. Scott Rodgers, San Diego, CA (US); Randall B. Olsen, Carlsbad, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 14 days.

(21) Appl. No.: 12/146,613

(22) Filed: Jun. 26, 2008

(51) Int. Cl.
*G02B 6/28* (2006.01)
(52) U.S. Cl. .................................... 385/24
(58) Field of Classification Search ............... 385/14, 385/15, 24, 37, 25, 48, 123; 359/577, 580, 359/589; 398/79; 356/345; 350/96.15, 96.18, 350/96.33
See application file for complete search history.

(56) References Cited

U.S. PATENT DOCUMENTS

| | | | |
|---|---|---|---|
| 3,892,468 A * | 7/1975 | Duguay | 385/4 |
| 4,750,802 A * | 6/1988 | Bhagavatula | 385/33 |
| 5,002,350 A | 3/1991 | Dragone | |
| 5,367,586 A | 11/1994 | Glance et al. | |
| 6,608,721 B1 | 8/2003 | Turpin et al. | |
| 6,731,828 B2 * | 5/2004 | Kitou et al. | 385/14 |
| 6,865,320 B1 * | 3/2005 | Westbrook | 385/37 |
| 7,043,108 B1 * | 5/2006 | Olsen | 385/14 |
| 7,084,985 B2 | 8/2006 | Xie et al. | |
| 7,174,073 B1 | 2/2007 | Olsen | |
| 7,239,775 B2 | 7/2007 | Xu et al. | |

\* cited by examiner

*Primary Examiner*—Alexander Gilman
(74) *Attorney, Agent, or Firm*—Kyle Eppele; Peter A. Lipovsky

(57) ABSTRACT

A photonic processor having a high spectral resolution which separates an input optic signal into numerous channels and a method of constructing same are provided. The photonic processor includes an optical delay line spiral having dips to compensate for path length differences between the various paths such that each path is an integer multiple of a fixed path length. Straight segments are included in the spiral design to offset the dips in the spiral such that they do not overlap. A number of waveguide taps are included that may launch the channelized light signals into a photonic lens.

20 Claims, 2 Drawing Sheets

SUPER-S MULTIPLE-TAPPED OPTICAL DELAY LINE

FEDERALLY-SPONSORED RESEARCH AND DEVELOPMENT

This invention (Navy Case No. 99,117) is assigned to the United States Government and is available for licensing for commercial purposes. Licensing and technical inquires may be directed to the Office of Research and Technical Applications, Space and Naval Warfare Systems Center, San Diego, Code 2112, San Diego, Calif. 92152; voice (619) 553-2778; email T2@spawar.navy.mil.

BACKGROUND OF THE INVENTION

An optical delay line can be used to separate the particular colors, i.e. the light waves of different wavelengths, of a chromatic spectrum. An example of such a device is an arrayed waveguide grating (AWG). If a conventional AWG is designed for extremely high color or spectral resolution, the AWG must have great physical size, which makes practical application of such devices difficult.

Such AWGs are commonly used as optical demultiplexers in wavelength division multiplexed (WDM) systems. The transmission capacity of such WDM systems is dependent on the AWG's ability to separate out the different wavelength carriers of the optical network. The higher the spectral resolution, the more information that will be able to be transmitted along the single optical fiber.

One such optical delay line that provides a very high resolution AWG system, i.e., a hyper-resolution AWG system is described in U.S. Pat. No. 7,043,108 to Olsen, entitled PLANAR MULTIPLE-TAPPED OPTICAL DELAY LINE, the teachings and disclosure of which are incorporated by reference in their entireties herein. As described therein, such a delay line includes a spiral of optical waveguide having a number of spiral waveguide loops disposed within a single plane. Broadband optical energy is received at an input end of the waveguide spiral and is released through optical tap areas in the waveguide loops. The end of the waveguide can be a waveguide termination such as a matched load that decreases reflection. Olsen describes that while waveguide loop numbers on the order of 10 are suitable for many purposes, waveguide loop numbers on the order of 100 will provide greater frequency resolution fidelity. The minimum curvature of the waveguide loops will be dictated by the bending limits suggested by the waveguide manufacturer.

In an understood manner, the length by which optical signals travel in a waveguide affects the phase of the traveling light and hence provides a mechanism by which the colors of the incoming light can be separated. In essence, different waveguide phase lengths permit different frequencies of light to be segregated from other frequencies of light. It is thereby possible to spread the colors of light out by creating a phase length difference that corresponds to a particular desired travel time of the light, wherein 1 divided by this desired travel time creates the approximate upper limit to the frequency resolution of a hyper-resolution AWG.

For example, to create a frequency resolution of approximately 100 MHz (0.1 GHz), a path length (in a vacuum) of approximately 10 feet of travel or 10 nanoseconds of light travel time is required. Because the index of refraction of glass (waveguide) differs from that of a vacuum, a shorter length of fiber is suitable to accomplish this delay. In this instance, approximately six feet of waveguide, between the first and last optical taps provides a 0.1 GHz resolution. To create a 1 GHz frequency resolution, approximately 0.6 feet of optical waveguide between the first and last optical taps is needed. To create a 10 GHz frequency resolution, approximately 0.06 feet of optical fiber between the first and last optical taps is needed. Higher resolution can be achieved by lengthening the distance between these first and last optical taps.

Unfortunately, for proper operation of the AWG, each loop must have a path length that is an integer multiple of some fixed path length, i.e. $L_{i+1}-L_i=\Delta L$, where $L_i$ is the length of the $i^{th}$ path, equivalently $L_i-L_1=(i-1)\Delta L$. This requirement has heretofore dictated the physical size of the high resolution (<100 MHz spectral resolution) AWG photonic frequency separation devices.

There is thus a need for an optical delay line that provides high spectral resolution but that is compact. For many applications it is desirable that such a delay line be realizable in planar form. An optical delay line having these attributes can enable a very high resolution AWG system (a hyper-resolution AWG system) with spectral resolution <100 MHz. These and other advantages of the invention, as well as additional inventive features, will be apparent from the description of embodiments of the invention provided herein.

BRIEF SUMMARY OF THE INVENTION

In view of the above, embodiments of the present invention provide a new and improved arrayed wave guide device (AWD) device and method of designing same, and more particularly an AWD and method having high spectral resolution in a compact size. In one embodiment, the AWD operates as a photonic processor having a high spectral resolution. Preferably, the AWD is a photonic frequency separation device with a spectral resolution <100 MHz.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE EMBODIMENTS

Figure 1:
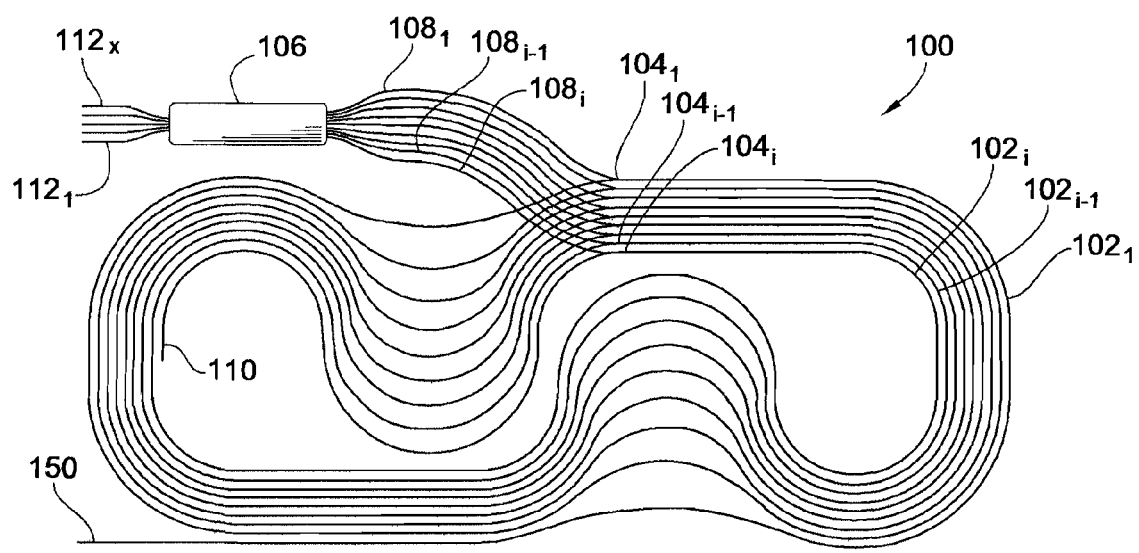
FIG. 1 is a simplified schematic illustration of an embodiment of an AWD constructed in accordance with the teachings of the present invention having high spectral resolution and suitable for operation as a photonic processor.

Turning now to the drawings, there is illustrated in FIG. 1 a schematic layout of an AWD 100 constructed in accordance with the teachings of the present invention. Such an embodiment may find particular applicability as a photonic processor of high spectral resolution, i.e. a high resolution <100 MHz photonic frequency separation device. It should be noted, however, that while the follow description will describe various embodiments of the present invention and particular application to which such embodiments find particular applicability, such is given by way of example only, and not by way of limitation.

Unlike prior AWGs, embodiments of the AWD 100 constructed in accordance with the teachings of the present invention utilize long paths in a spiral tapped delay line that may be constructed in a compact configuration that provide the time delay necessary to achieve high spectral resolution without taking up a large space. As a photonic processor, light is tapped off the loops $102_i$ of the delay line at various locations $104_i$ by taps $108_i$ and combined in a photonic lens 106 or otherwise processed. Each optical tap $108_i$ that goes into the lens 106 is coupled to the AWD device 100 on successive loops of the spiral such that each has an incremental path length difference.

A path in the device is defined as the optical distance that the light travels to be launched into the lens 106. The paths are typically labeled based on the order that the tap 108 appears on the spiral from the input 150. Along the first path, the shortest path, light enters the spiral at the input 150 and is tapped off at the first tap $108_1$. Along the second path light enters the spiral at the input 150 and is tapped off a second tap $108_2$. The path naming convention continues in like manner up to the total number of taps $108_i$. End 110 of the spiral can be a waveguide termination such as a matched load that decreases reflection.

As a constraint on proper operation of the AWD 100, each path length must be an integer multiple of some fixed path length, i.e. $L_{i+1} - L_i = \Delta L_i$ where L is the length of the $i^{th}$ path, equivalently $L_i - L_1 = (i-1)\Delta L$. With this constraint in mind, an embodiment of the present invention provides a method to design a photonic processor in a compact area while maintaining the required path length differences.

The basic design procedure for an AWD 100 is to design the spiral. Then, based on the desired tap weights and loss in the waveguides, the coupling coefficients and the crossing angles for the taps $108_i$ are determined using known calculations. Once these parameters are determined, the taps $108_i$ and waveguides that launch light into the lens 106 are designed. The design of the spiral and waveguide taps $108_i$ going into the lens 106 may be iterated as each spiral lap length may need to be adjusted to compensate for path length differences in the taps $108_i$. Of course, no iterations are required in designs in the first order. Finally, the lens 106 and output waveguides $112_x$ for the separated frequencies are designed.

The design of a photonic processor, such as that illustrated in FIG. 1, in accordance embodiments of the present invention begins with the spiral AWG device 100. The design of this section determines the majority of the physical area occupied by the overall AWD 100. The spiral designed in accordance with the teachings of the present invention has several properties that allow for each lap or loop $102_i$ around the spiral to be equated for physical and/or optical path length.

Figure 2:
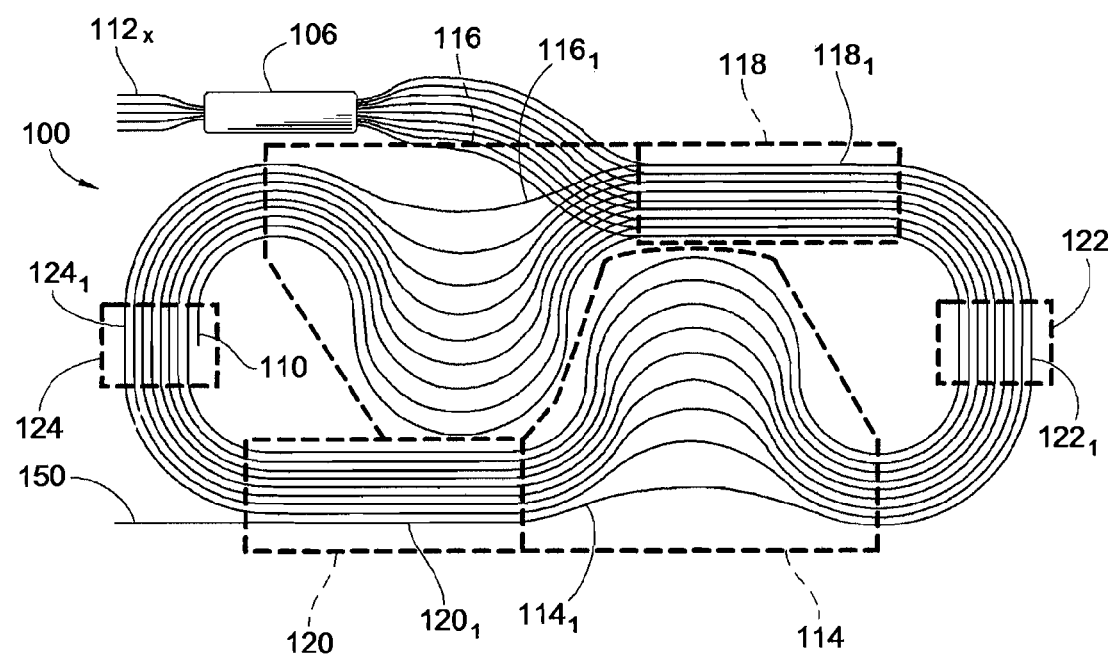
FIG. 2 is a simplified schematic illustration of the embodiment of the AWD of FIG. 1 highlighting certain features thereof.

As illustrated in FIG. 2, the first, most apparent departure from a typical AWG device are the "dips" $114_i$, $116_i$ into the center of spiral area. In the illustrated embodiment, there are two groupings of dips $114_i$, $116_i$ located on opposite sides of the spiral. These dips $114_i$, $116_i$ allow for length compensation. Without the dips $114_i$, $116_i$ the length of each lap or loop $102_i$ into the spiral is slightly shorter than the one before it (loop $102_{i+1}$).

Also apparent in the embodiment illustrated in FIG. 2 is the inclusion of straight segments $118_i$, $120_i$, $122_i$, $124_i$. As illustrated, there are four of these segments $118_i$, $120_i$, $122_i$, $124_i$ located at 90° angle to its neighbors. The straight segments $118_i$, $120_i$, $122_i$, $124_i$ serve to shift the dip sections 114, 116 both horizontally and vertically as illustrated and oriented in FIG. 2 so that they do not overlap. In other words, the horizontal offset in FIG. 2 is achieved when the pair of straight segments are positioned in proximity to but on opposite sides of the pair of dips to offset them relative to one another along an axis defined parallel to a length of the pair of straight segments on the horizontal axis. The vertical offset is provided by the pair of straight segments that are positioned so as to offset the pair of dips along an offset axis parallel to a vertical dip axis of the dips as oriented in FIG. 2. This enables an arbitrary number of laps "i" to be designed into the AWD 100. If, however, the dips 114, 116 are not shifted the number of laps that may be constructed in the AWG device 100 is limited to the point where the dips 114, 116 begin to overlap.

Additionally, one of the straight segments 118 is also used as the location for the crossing taps $108_i$. The length of each of the straight segments 118, 120, 122, 124 is determined by the number of laps or loops $102_i$ in the spiral. Typically, this is equal to the number of taps $108_i$, but this is not necessary, i.e. not every lap requires a tap depending on the spectral makeup of the optical signal to be demodulated.

Once the dips 114, 116 and straight segments 118, 120, 122, 124 are included, the design of the AWG device 100 is then optimized to minimize loss. This requires that the transitions between segments of different curvature be carefully designed. The simplest choice is to make the tangent of the two segments of different curvature to be equal at the point of joint. This leads to some loss due to mode mismatch. However, this can be improved by offsetting the segments at the joint to improve the optical mode overlap. Further improvements can be made by tapering without loss the curvature from that of one segment to that of the segment to be joined to it. Different embodiments of the present invention utilize different ones or combinations of these types of joints provided the path length of each segment is known.

With these design parameters in mind, the design of the spiral of the AWG device 100 itself begins by specifying the width of the waveguides, the minimum bending radius, the minimum spacing between waveguides, and the number of laps required. Such design criteria and selection therefore may be in accordance with the Olsen '108 patent discussed above or other known techniques. This data is then used the calculate the path length difference that must be compensated by the dips 114, 116. The straight segments 118, 120, 122, 124 do not affect the amount of path length that for which dips 114, 116 must compensate, only the corner segments contribute. Thus, once the number of laps, minimum waveguide spacing, minimum bending radius, and waveguide width are determined, the path length of each curve can be calculated.

As will be recognized by from the foregoing by those skilled in the art, there are several ways of forming the base spiral. Specifically, the spiral may be formed by continuous variation in radius of curvature of each corner segment, or the spiral may be formed by having each of the four corners in a lap have the same radius of curvature, incrementing the radius for each lap, and then offsetting the curves to connect them in a spiral geometry. In embodiments of the present invention utilizing the straight segments, a preferred structure utilizes the offset method for forming the spiral. Specifically, this was done by increasing the length of one straight segment by the minimum waveguide separation.

As discussed above, the dips 114, 116 are designed to compensate for the path length difference in each path. Once the dips 114, 116 have been designed, the length of the straight segments 118, 120, 122, 124 are determined so that the dips 114, 116 do not overlap. If the dips 114, 116 are sufficiently small then the straight segments 118, 120, 122, 124 may not be needed as the dips 114, 116 will never overlap.

In such an embodiment, the length of two straight segments 118, 120 is determined by the length of the strongest crossing coupler or tap 108. The amount of compensation for each dip 114, 116 can be adjusted to accommodate small variations in the tap 108 length. This requires an iterative process as the length of each lap or loop 102 affects the crossing angle through the waveguide loss, which in turn alters the length of each tap 108. Typically, one iteration is sufficient, however the design can be improved to $1^{-12}$ after only three iterations.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

It will be understood that many additional changes in the details, materials, steps and arrangement of parts, which have been herein described and illustrated to explain the nature of the invention, may be made by those skilled in the art within the principle and scope of the invention as expressed in the appended claims.

The invention claimed is:

1. An optical delay line, comprising:
   a spiral waveguide having a plurality of loops beginning with an input for receiving optical energy;
   a plurality of optical taps operatively coupled to the spiral waveguide for receiving optical energy therefrom; and
   wherein at least one of the loops of the spiral waveguide includes a dip configured to substantially equate the length of the dip-configured loop with the length of another loop in the spiral waveguide.

2. The optical delay line of claim 1, wherein substantially all of the loops of the plurality of loops include a dip.

3. The optical delay line of claim 1, wherein the at least one of the loops of the spiral waveguide includes a pair of dips located on opposite sides of the spiral wave guide, the pair of dips configured to equate the length of the multiple-dip-configured loop with the length of another loop in the spiral waveguide.

4. The optical delay line of claim 3, wherein the spiral waveguide further comprises a pair of straight segments positioned on opposite sides of the spiral waveguide so as to ensure that there is no overlap of the pair of dips.

5. The optical delay line of claim 4, wherein the pair of straight segments are positioned in proximity to but on opposite sides of the pair of dips to offset the pair of dips relative to one another along an axis defined parallel to a length of the pair of straight segments.

6. The optical delay line of claim 4, wherein the pair of straight segments are positioned so as to offset the pair of dips along an offset axis parallel to a dip axis of the dips.

7. The optical delay line of claim 4, wherein the spiral waveguide further comprises a second pair of straight segments positioned on opposite sides of the spiral waveguide so as to offset the pair of dips relative to one another to ensure no overlap thereof along an axis defined parallel to a length of the pair of straight segments and along an offset axis parallel to a dip axis of the dips.

8. The optical delay line of claim 4, wherein the plurality of optical taps are operatively coupled to the spiral waveguide along one of the pair of straight segments.

9. The optical delay line of claim 1, wherein the dip is oriented inwardly to the spiral waveguide.

10. A high resolution photonic processor, comprising:
    a spiral waveguide having a plurality of loops beginning with an input for receiving optical energy;
    a plurality of optical taps operatively coupled to the spiral waveguide for receiving optical energy therefrom;
    a photonic lens operatively coupled to the plurality of optical taps; and
    a plurality of output optic waveguides operatively coupled to the photonic lens; and
    wherein at least one of the loops of the spiral waveguide includes a dip configured to substantially equate the length of the dip-configured loop with the length of another loop in the spiral waveguide.

11. The photonic processor of claim 10, wherein substantially all of the loops of the plurality of loops include a dip.

12. The optical delay line of claim 10, wherein the at least one of the loops of the spiral waveguide includes a pair of dips located on opposite sides of the spiral wave guide, the pair of dips configured to equate the length of the multiple-dip-configured loop with the length of another loop in the spiral waveguide.

13. The optical delay line of claim 12, wherein the spiral waveguide further comprises a pair of straight segments positioned on opposite sides of the spiral waveguide so as to ensure that there is no overlap of the pair of dips.

14. The optical delay line of claim 13, wherein the pair of straight segments are positioned in proximity to but on opposite sides of the pair of dips to offset the pair of dips relative to one another along an axis defined parallel to a length of the pair of straight segments.

15. The optical delay line of claim 13, wherein the pair of straight segments are positioned so as to offset the pair of dips along an offset axis parallel to a dip axis of the dips.

16. The optical delay line of claim 13, wherein the spiral waveguide further comprises a second pair of straight segments positioned on opposite sides of the spiral waveguide so as to offset the pair of dips relative to one another to ensure no overlap thereof along an axis defined parallel to a length of the pair of straight segments and along an offset axis parallel to a dip axis of the dips.

17. The optical delay line of claim 13, wherein the plurality of optical taps are operatively coupled to the spiral waveguide along one of the pair of straight segments.

18. The optical delay line of claim 10, wherein the dip is oriented inwardly to the spiral waveguide.

19. A method of designing a photonic processor, comprising the steps of:
   designing an optical delay line having a waveguide spiral having a plurality of loops by specifying a waveguide width, a minimum spacing between loops, a number of loops for the spiral;
   calculating a path length difference for each of the loops of the spiral;
   compensating for the path length difference by adding one or more dips in the loops to ensure that the loops are essentially equal in length.

20. The method of claim 19, further comprising the step of adding at least a pair of straight segments on opposite sides of the spiral to offset the dips so that the dips do not overlap.

* * * * *